United States Patent [19]

Kennison

[11] 4,264,253

[45] Apr. 28, 1981

[54] METHOD AND APPARATUS FOR FORMING A LUMBER STACK AND PLACING STICKS BETWEEN ADJACENT COURSES IN THE STACK

[76] Inventor: Harry E. Kennison, P.O. Box 1129, Heppner, Oreg. 97836

[21] Appl. No.: 5,999

[22] Filed: Jan. 24, 1979

[51] Int. Cl.³ .............................................. B65G 57/26
[52] U.S. Cl. ..................................... 414/42; 198/488; 198/774; 221/266; 414/60; 414/83; 414/129
[58] Field of Search ....................... 414/32, 41, 42, 60, 414/82, 83, 84, 85, 125, 126, 129, 131, 786; 221/266; 198/425, 487, 488, 774

[56] References Cited

U.S. PATENT DOCUMENTS

| | | | |
|---|---|---|---|
| 2,393,961 | 2/1946 | Almgren | 221/266 X |
| 2,792,922 | 5/1957 | Malhiot | 414/129 X |
| 2,861,702 | 11/1958 | Mason | 414/60 |
| 2,998,147 | 8/1961 | Rysti | 414/42 X |
| 3,169,646 | 2/1965 | Mason | 414/82 X |
| 3,217,859 | 11/1965 | Bartlo et al. | 198/425 |
| 3,737,072 | 6/1973 | Deitrick | 221/266 X |
| 3,738,510 | 6/1973 | Mason | 414/42 X |
| 3,823,834 | 7/1974 | Rysti | 414/42 |
| 3,968,886 | 7/1976 | Leon | 414/42 |

FOREIGN PATENT DOCUMENTS

| | | | |
|---|---|---|---|
| 928476 | 6/1963 | United Kingdom | 414/129 |
| 211393 | 4/1968 | U.S.S.R. | 414/42 |

*Primary Examiner*—Leslie J. Paperner

*Attorney, Agent, or Firm*—Kolisch, Hartwell & Dickinson

[57] ABSTRACT

Method and apparatus for forming a stack of elongate articles, such as lumber, by vertically laying successive lumber courses and providing sticks between adjacent courses includes a conveyor operable for transferring a course to be stacked to a first station, a course positioner disposed adjacent the conveyor operable for selectively elevating a course as a unit and shifting it into position above a stacking station and a stick placer disposed above the stacking station operable for selectively depositing sticks generally transversely to the lengthwise dimension of the course at laterally spaced locations thereon. Further, the positioner includes elongate members rotatably mounted on a carriage, the elongate members being operable, during rotation thereof, for selective positioning above and below the riding surface of the conveyor to thereby raise and lower a course relative to the conveyor. The carriage is reciprocally shiftable relative to the direction of transfer of the conveyor for selectively locating the elongate members adjacent the first station and the stacking station. The stick placer includes a driven rotary feed operable for periodically receiving sticks and directing them through a predetermined angular displacement and periodically releasing them onto successive courses. The rotary feed includes a plurality of rotatable wheel sets disposed above the stacking station adjacent locations where the sticks are to be deposited, and each wheel set is disposed beneath a stick-containing bin and includes a pair of opposed, spaced-apart concentrically mounted wheels operable for receiving sticks.

28 Claims, 12 Drawing Figures

METHOD AND APPARATUS FOR FORMING A LUMBER STACK AND PLACING STICKS BETWEEN ADJACENT COURSES IN THE STACK

BACKGROUND AND SUMMARY OF THE INVENTION

The present invention relates to a method and apparatus for forming a lumber stack, and more particularly to a novel method and apparatus for forming a lumber stack and placing sticks between adjacent tiers or courses in a stack being formed.

In the stacking of lumber, it is conventional to place sticks between adjacent courses during laying of the courses so that the courses are vertically spaced-apart according to the thickness of the sticks. Whether mechanically or manually placed on a course prior to the laying of the next course, the sticks are generally positioned tranversely to the longitudinal dimension of the stack. The actual number of sticks placed depends upon the length of the stack, the primary consideration being to space adjacent courses from one another so that adequate air circulation may be obtained during drying of the stack in a kiln.

There are several problems present in known lumber stacking apparatus which arise out of the difficulty of accurately placing or depositing sticks. Sticks are generally dimensioned one inch by two inches for a given length, with the two inch dimension being deposited to face adjacent courses. It is necessary that stick placement not inadvertently result in some of the sticks having the shorter or one inch dimension facing the adjacent courses. This is because the lumber on a course must repose generally horizontally and in parallel relationship with adjacent courses or warpage during drying will occur. Unfortunately, it has been difficult to develop apparatus for placing sticks which will ensure that the sticks do not become improperly oriented during placement on a course.

Additionally, several known apparatus for stacking lumber and placing sticks require that the sticks be dropped from a given elevation onto a course disposed therebeneath. During dropping, the sticks may become skewed relative to the lengthwise dimension of the stack as well as inadvertently bounce so that their width faces vertically. Thus, it is a considerable problem to provide a method, other than manual stick placement, which will ensure reliable and accurate placement of sticks. Of course, manual stick placement is extremely wearisome as well as time consuming and therefore uneconomical.

Another problem with known apparatus for placing sticks resides in the fact that it has been difficult to provide a design which will enable vertical dropping of only a selected stick from a stick containing bin. Stated differently, complicated mechanisms must be provided in order to retain sticks and selectively drop only a single stick at a preselected location on a course. Certainly, if more than one stick is dropped at a preselected location on a course, wastage of materials will result as well as the possibility of stacking sticks which may cause uneven laying of a course on a stack.

Still another problem present with prior art apparatus for stacking lumber and placing sticks resides in the lack of separating adjacent pieces of lumber in each course so that air flow will be permitted to travel vertically upwardly between the courses in a kiln to ensure adequate drying of the lumber. In this regard, it is to be noted that separation of lumber in the courses must not be such that opposite side boundaries of the stack do not define substantially vertical planes. The requirement for vertical planes is based on the fact that even sweeping of air during drying over the stack would be adversely effected if lumber adjacent the vertical sides of the stack were not stacked evenly.

Accordingly, it is a general object of the present invention to provide an apparatus for forming a lumber stack by laying successive courses and providing sticks between adjacent courses which includes a placing means operable for selectively depositing sticks generally transversely to the lengthwise dimension of a course by first receiving a stick, directing it through a predetermined angular displacement and then releasing same to the course at laterally spaced locations thereon.

More particularly, it is an object of the present invention to provide an apparatus for placing sticks in which the placing means includes a driven rotary feed means having a plurality of wheel sets disposed above a stacking station which receives a lumber course. Each wheel set is disposed beneath a stick-containing bin and includes a pair of opposed spaced-apart concentrically mounted wheels, each wheel being rotatable and provided with a plurality of stick-receiving means aligned with corresponding stick-receiving means on an associated opposed wheel. Upon rotation of the wheels, the stick-receiving means is movable through the predetermined angular displacement for receiving a stick from the bin with the stick's longitudinal axis being generally positioned parallel to the axis of rotation. By providing such a construction, it is possible to charge or load the wheel sets continuously with sticks and periodically release them onto spaced-apart locations on a receiving course.

Still another object of the present invention is to provide wheel sets, as described above, in which the stick receiving means are each defined by a plurality of notches or recesses formed adjacent the outer periphery of each wheel. The recesses are dimensioned for receiving and holding a stick so that it may be directed through the predetermined angular displacement from a position beneath a bin to a position for dropping the stick. Additionally, with a plurality of recesses being provided, each wheel set may continuously hold and direct through the predetermined angular displacement a plurality of sticks.

Yet another object of the present invention is to provide an apparatus, as described above, further including detaining means provided adjacent one wheel of each wheel set selectively operable for engaging one end of a released stick and momentarily maintaining it above a course prior to complete release of the stick. Stated differently, it is contemplated that upon movement of a stick through the predetermined angular displacement, one end of the stick will be dropped onto the course but the other end, after being released from the opposed wheel, will be momentarily prevented from dropping onto the course. The advantage in detaining one end of a stick resides in the fact that bouncing of a stick may be substantially prevented which ensures that a stick will not become skewed relative to the lengthwise dimension of a course or tipped up on its edge. By permitting one end to contact the course first, and then permitting the other end to drop, a more recise, controlled depositing of a stick is obtained.

Still a further object of the present invention is to a provide an apparatus, in which an overall embodiment contemplates the provision of a conveying means operable for transferring a course to be stacked to a first station and a positioning means operable for selectively elevating the course, horizontally as a unit, and then shifting it into position above a stacking station prior to operation of the above-described placing means. Further elaborating, the present invention contemplates that the positioning means, which includes a carriage means operable for shifting in the direction of conveyance, is additionally operable for elevating the course and shifting it directly beneath the placing means. It is necessary to elevate the course in order to pick it off the riding surface of the conveying means and separate it from upstream lumber. Additionally, it is necessary to shift the elevated course to a position as close as possible beneath the wheel sets so that each stick, as it is dropped, need fall only a minimal amount.

These and additional objects and advantages of the present invention will be more clearly understood from a consideration of the following drawings taken together with a detailed description of the preferred embodiment.

DETAILED DESCRIPTION OF THE PREFERRED EMBODIMENT

Before specific structural features of the preferred embodiment are set forth, a brief description of the method of forming a lumber stack by laying successive courses and providing sticks between adjacent courses in accordance with the present invention will be given. Initially, lumber (which may include pieces of different widths) is transferred along a conveying means to a first bay or station. A leading piece of lumber is stopped which in turn batches up lumber on its upstream side. The batch forms a course which will become a tier on a stack and such course is isolated from the upstream lumber. Next, the course is elevated and shifted forwardly to a position above a stacking station which includes a platform for supporting a stack. A stick placing means deposits sticks on the course at laterally spaced locations thereon and the course is lowered onto the platform and previously placed sticks. After lowering, the course is then separated so that an air space is provided intermediate the sides of the course. This process is continuously repeated until a stack of predetermined height is developed.

Figure 1:
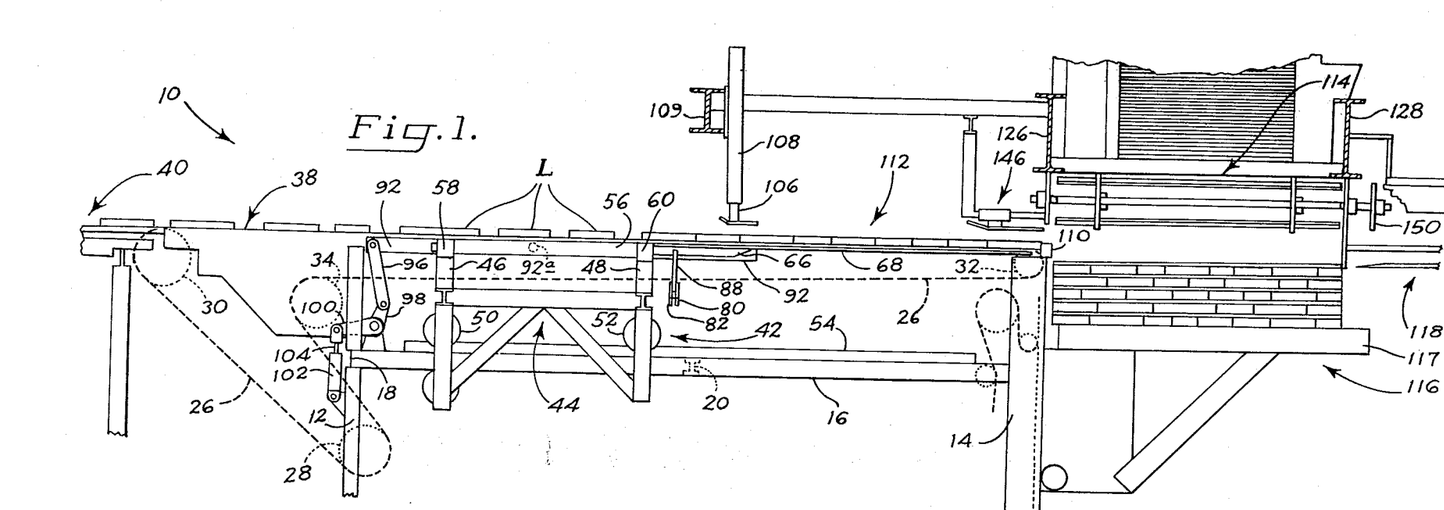
FIG. 1 is a side elevation view of a portion of the apparatus of the present invention illustrating conveying of lumber to a first station so that the lumber is in a pre-spot position prior to its being charged or shifted into position for eventual placement on a stack being formed.

With this brief overview in mind, attention is now directed generally to FIGS. 1-4 and initially to FIG. 1. As illustrated in FIG. 1, apparatus for forming a lumber stack according to the invention is generally indicated at 10 and includes a suitable frame structure for supporting a conveying means above a floor surface. More particularly, suitably positioned upright structural or frame members such as indicated at 12, 14 are spaced-apart in the manner shown and are suitably interconnected by cross members such as indicated at 16. Extending into the plane of FIG. 1 are laterally extending cross members 18, 20 etc. which are connected to additional upright members (not shown). Supported on cross and upright members are a plurality of spaced-apart raceways 22, 24, etc. (see FIG. 5) which serve to guide endless conveying chains.

Figure 5:
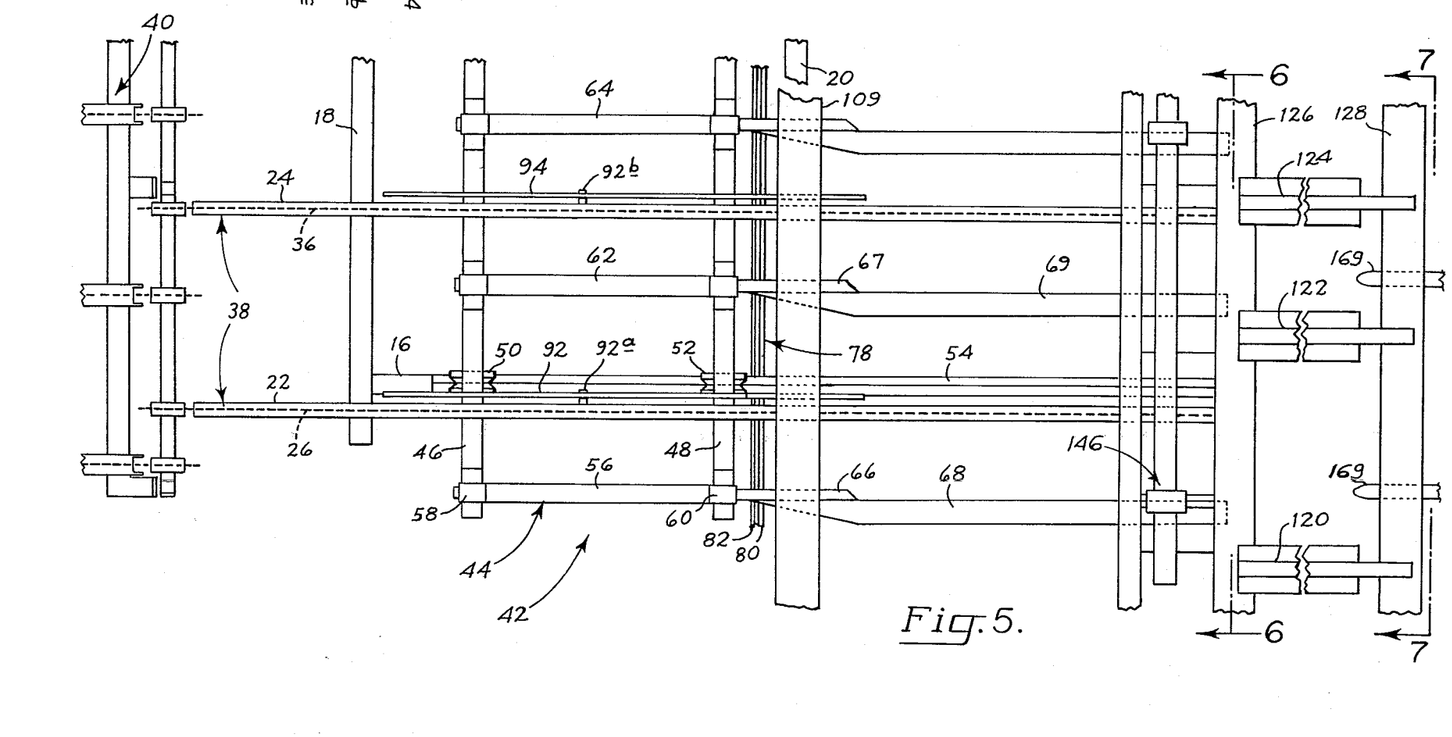
FIG. 5 is a general and schematic top plan view of the apparatus shown in FIG. 1, with certain portions being deleted for purposes of clarity.

For instance, as shown in FIG. 1, an endless conveying chain 26 is suitably trained over drive sprocket 28, sprocket 30 (mounted on supports not shown) and forward sprocket 32. An idler sprocket is shown at 34 and is supported by suitable structure not shown. Similarly, as shown in FIG. 5, another conveying chain 36 is driven over raceway 24 so as to be driven at the same rate as conveying chain 26. While not specifically illustrated in FIG. 5, it is contemplated that other conveying chains will be provided in order to convey lumber, such as indicated at L, to the right as shown in FIGS. 1 and 5, and such conveying chains as indicated at 22, 24 will be referred to hereinafter as a conveying means generally indicated at 38. The conveying means is operable for receiving lumber from an infeed, upstream conveyor, generally indicated at 40 and transferring lumber of different widths to be stacked at a stacking station to be described hereinafter. Mounted on cross member 18 and other cross members spaced across the width of apparatus 10 is a positioning means generally indicated at 42 which is operable for selectively elevating a course of lumber horizontally as a unit and charging or shifting it rectilinearly into position above a stacking station.

For instance, positioning means 42 includes a carriage means generally indicated at 44 which is formed of structural members mounted on wheels. Explaining further, carriage means 44 includes laterally extending frame members 46, 48 which are laterally positioned across the width of apparatus 10 beneath raceways 22, 24 etc. This is clearly shown in FIG. 5. Additionally, additional carriage means frame structure is shown in FIG. 1 and suitable rollers or wheels such as indicated at 50, 52 are rotatably mounted on the carriage means for travel along a track 54 which extends along the longitudinal direction of and is mounted on cross member 16. Similarly, on the opposite side of the width of apparatus 10, additional wheels are mounted for supporting carriage means 44 on another track (see the right of FIG. 6).

As mentioned previously, positioning means 42, which includes carriage means 44, is provided with means for elevating a lumber course. Such means includes a plurality of elongate members which are rotatably mounted on carriage means 44 and extend forwardly thereof. For instance, as shown in FIGS. 1 and 5, an elongate member 56 is rotatably mounted on carriage means 44 by means of opposed pillow blocks 58, 60 which are supported on cross members 46, 48, respectively. Similarly, and as shown in FIG. 5, additional elongate members 62, 64 are suitably mounted on carriage means 44 and are rotatable about their longitudinal axes.

Considering elongate member 56 in further detail, it can be seen that it is connected to a forwardly extending mounting shaft 66 rotatable about its longitudinal axis provided for mounting an elongate, planar lift element 68. This construction may also be appreciated from a consideration of FIG. 6 which illustrates shaft 66 and lift element 68 connected thereto with the lift element having its longitudinal axis lying on a plane extending generally radially relative to the rotational axes of elongate member 56 and shaft 66. Another shaft 67 having a lift element is shown extending from elongate member 62. Thus, it can be appreciated that upon suitable rotation of elongate members 56, 62, lift elements 68, 69, respectively, will be correspondingly rotated.

Figure 6:
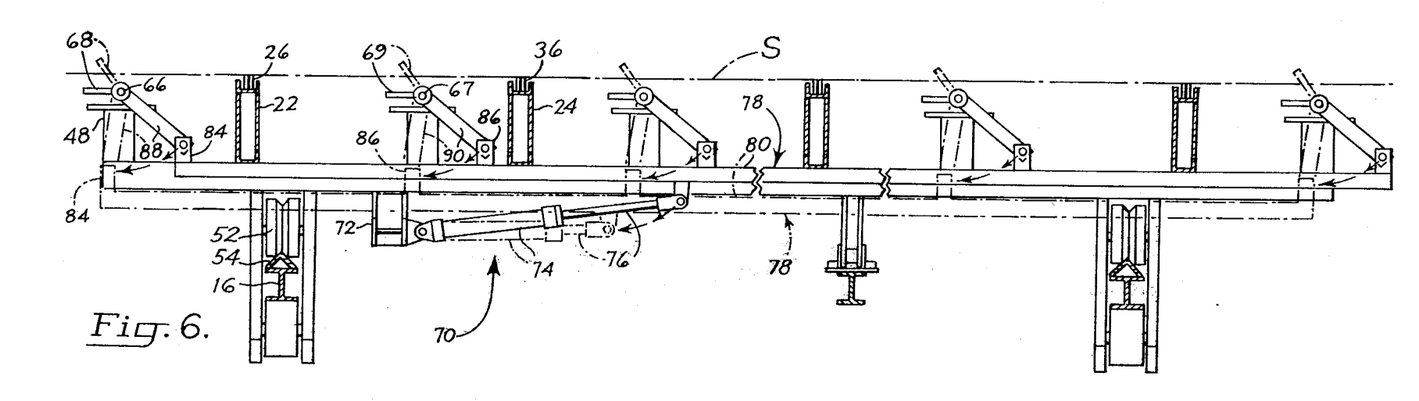
FIG. 6 is a view taken along lines 6—6 of FIG. 5 and illustrates mechanism for elevating a course of lumber.

Turning now to a description of an actuating means for imparting rotation to elongate member 56 and shaft 66, attention is directed to FIG. 6. As illustrated, an actuating means generally indicated at 70 is connected to a mount 72 which is suspended from frame member 48 of the carriage means. Actuating means 70 includes a power-driven means, such as a fluid actuated cylinder 74 operable for extending and retracting a rod 76. Actuating means 70 also includes elongate arm means generally indicated at 78 extending generally tranversely to the direction of conveyance and disposed beneath shaft 66 and the other shafts. Arm means 78 includes a pair of arm members 80, 82 which are positioned generally parallel relative to one another and are rigidly connected to spaced-apart links 84, 86 which are pivotally connected to further links 88, 90, etc. Links 88, 90 are rigidly connected at an opposite end to shafts 66, 67, respectively. Similarly, as shown in FIG. 6, arm means 78 is connected to the other shafts.

With respect to imparting rotation to shafts 66, 70, etc., cylinder 74 is powered by a source (not shown) for selectively extending and retracting rod 76. As shown in solid outline in FIG. 6, rod 76 has been extended to orient arm means 78 generally to the right which positions lift elements 68, 69 mounted on shafts 66, 67, respectively and the other lift elements mounted on their associated shafts in generally horizontal position beneath a riding surface S (indicated in phantom lines) of the conveying means. Upon suitable actuation of cylinder 74, rod 76 will be retracted to impart lateral and oblique translation to arm means 78 for angularly displacing each lift element 68, 69, etc. above riding surface S. This position is shown in phantom lines in FIG. 6. To return the lift elements to a position beneath riding surface S, reciprocal lateral and oblique translation is imparted, by extending rod 76, to swing link 88, 90, etc. and their associated shafts in a counterclockwise direction. Thus, it can be seen that actuating means 70 mounted on carriage means 44 is operatively connected to arm means 78 for selectively shifting same, laterally and obliquely, to thereby impart rotation to shafts 66, 67, etc. The purpose of shifting lift elements 68, 69, etc. above and below the riding surface is to effect raising and lowering of a course of lumber for purposes which will become apparent as this description proceeds.

Figure 2:
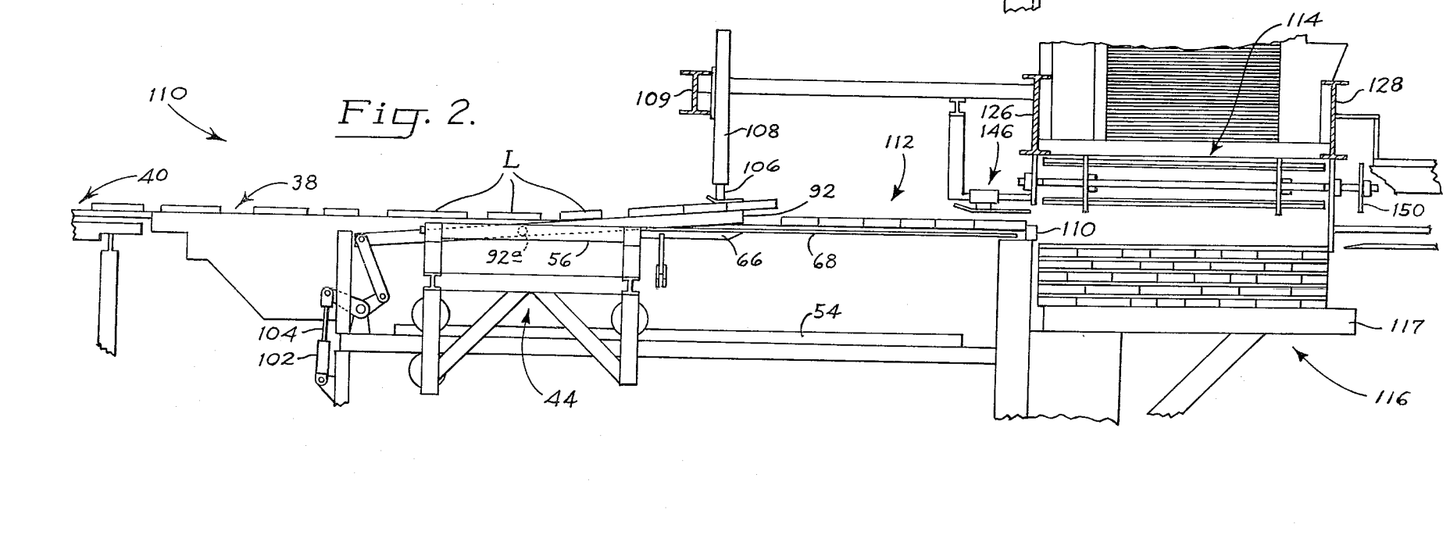
FIG. 2 is a side elevation view, similar to FIG. 1, illustrating isolating of a course at the first station from upstream lumber.
Figure 3:
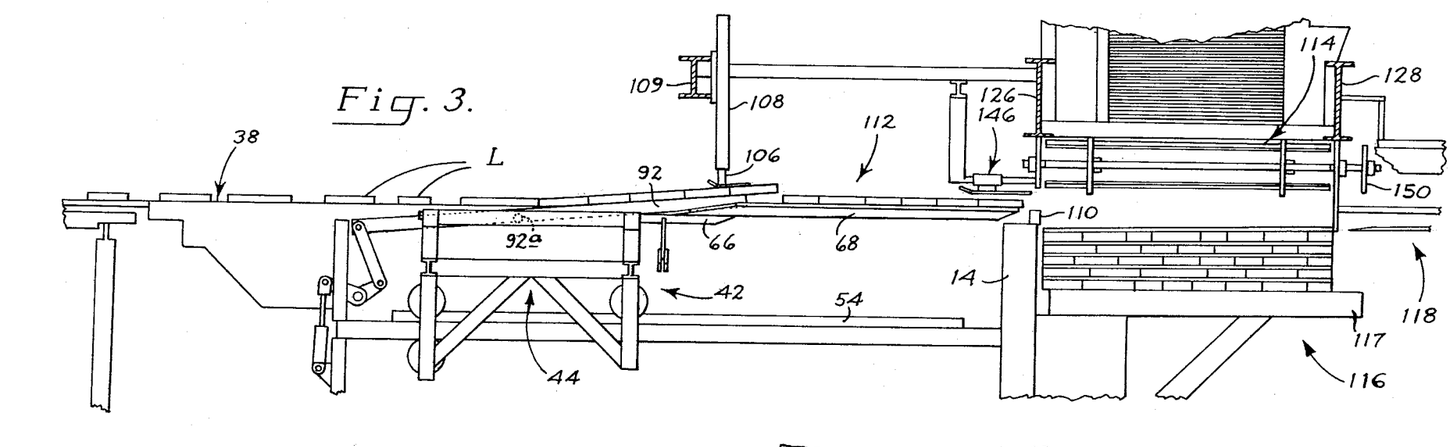
FIG. 3 is a side elevation view, similar to FIGS. 1 and 2, illustrating elevation of the course by a carriage means prior to its being shifted into position beneath a stick placing means and above a stack being formed.

Considering now additional features of apparatus 10, attention is redirected to FIGS. 1 and 5. As shown, (see FIG. 5) a plurality of swingable lumber-engaging means indicated at 92, 94, etc. include pivotal members pivotally connected intermediate their lengths (as at 92a, 92b) to raceways 22, 24, respectively, for normal positioning with their upper or lumber-engaging surfaces disposed beneath the riding surface of the conveying means. As shown in FIGS. 1 and 2, lumber-engaging means 92 is suitably interconnected by a series of pivotally connected links 96, 98 and 100 to a second actuating means 102. Links 98, 100 are rigidly connected to one another, and upon extension of rod 104, lumber-engaging means 92 will be pivotally swung about pivot connection 92a so that the lumber-engaging means pivots in a counterclockwise direction. Such pivoting is for the purpose of elevating lumber, as shown in FIG. 2, so that some of the lumber will be urged against a limit means inidicated at 106 to divert lumber from further downstream travel. As shown in FIG. 2, limit means 106 is suitably mounted on a support 108 which is interconnected to a cross beam 109. The result of this construction is the provision of a dividing means, which includes lumber-engaging means 92, 94 operable for selective upward positioning so that lumber is engaged against limit means 106 and is retarded from further downstream transfer by the conveying means. The lumber-engaging means are returnable downwardly for lumber disengagement from limit means 106 to permit further transfer downstream.

With attention now redirected to FIG. 1, it can be seen that lumber L is to be transferred to the right by conveying means 38 until a leading piece of lumber contacts a stop, one of which is indicated at 110 on upright 14. It is contemplated that there will be provided several spaced-apart stops, similar to that shown at 110 for impeding the downstream travel of lumber. Thus, lumber will be batched together at a first bay or station, generally indicated at 112. In order to isolate a course to be stacked, lumber engaging means 92, 94, etc. are swung pivotally upwardly, as shown in FIG. 2, so that pieces of lumber are urged or pinched against limit means 106. Upon suitable rotation of shafts 66, 67, etc., lift elements 68, 69 are rotated upwardly (see FIG. 6) so that the course located at first station 112 is elevated. This is the position shown in FIG. 3 and carriage means 44 is now shifted from its pre-spot position from the left, to the position shown in FIG. 4. The course is now charged into position with lift elements 68, 69 holding the course beneath a placing means, generally indicated at 114 and above a stacking station generally indicated at 116. A platform is indicated at 117 suitable for holding a stack and lowerable incrementally to accommodate a new course. As shown in FIGS. 1–4, a separating means generally indicated at 118 is partially shown but details concerning its operation will be deferred until a description of placing means 114 is complete.

Figure 8:
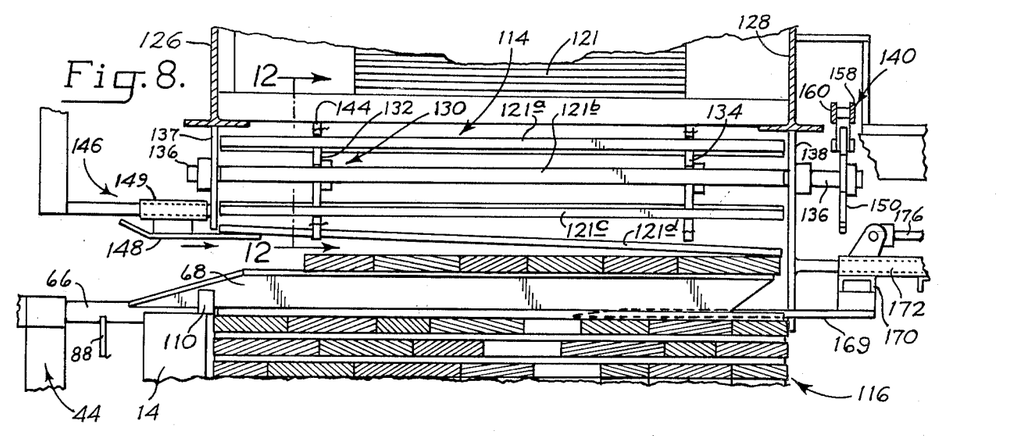
FIG. 8 is an enlarged side elevation view of the stick placing means similar to that shown in the right of FIG. 1 and illustrates initial dropping of one end of a stick from one wheel of a wheel set onto an elevated course, the other end of the stick being momentarily caught or detained by a detaining means prior to its being released onto the course.

Turning now to a description of placing means 114, attention is directed to FIG. 8 which illustrates an enlarged view of placing means 114 positioned above a developing stack in stacking station 116. More specifically, placing means 114 includes driven rotary feed means mounted beneath a stick receiving bin 120. Bin 120 is shown in the top plan view of FIG. 5, and it can be seen that other bins such as indicated at 122, 124, etc., are suitably positioned above locations where sticks are to be deposited on a course. Beneath each bin 122, 124, etc. there is disposed a mounted placing means, including rotary feed means, similar to that now being described with reference to FIG. 8.

Figure 12:
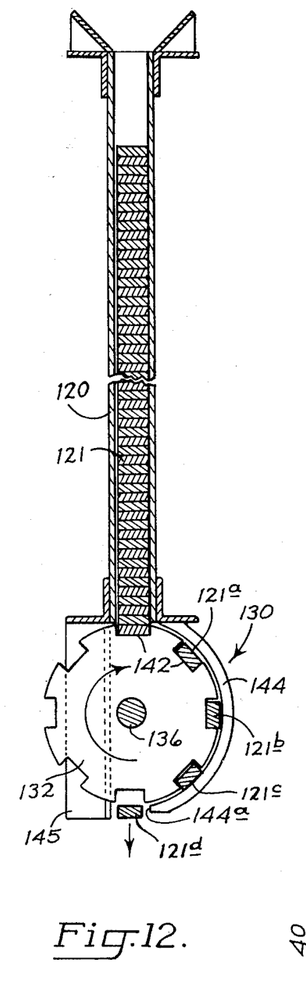
FIG. 12 is an end elevation view taken along lines 12—12 of FIG. 8, illustrating one wheel of a wheel set and its relative positioning to meet a stick-receiving bin for receiving sticks and directing them through a predetermined angular displacement for release onto a course.

As shown in FIG. 8, bin 120 is suitably mounted on opposed, laterally extending frame members 126, 128 and includes vertically upright and spaced-apart side walls for holding a layered stack of sticks. This construction is shown in FIG. 12 and illustrates the sticks being positioned above a rotary feed means generally indicated at 130. As illustrated in FIG. 8, rotary feed means 130 includes a wheel set having a pair of spaced-apart concentrically mounted wheels 132, 134. Wheels 132, 134 are mounted on a shaft 136 which is rotatably journaled in supports 137, 138 which are secured to and extending beneath frame members 126, 128, respectively. A drive or indexing means, details of which will be described hereinafter, is generally indicated at 140.

Returning to a consideration of FIG. 12, it can be seen that each wheel of a wheel set, such as wheel 132, is provided with a plurality of stick-receiving means such as notches or recesses indicated at 142. The recesses are circumferentially spaced-apart and formed adjacent the outer periphery of each wheel and are dimensioned for receiving a stick from bin 120. Explaining further, it can be seen that shaft 136 is mounted with its axis of rotation directly beneath bin 120 and generally parallel to the longitudinal axis of the sticks contained in the bin. With recesses 142 on wheels 132, 134 being aligned with corresponding recesses on the opposed wheel, rotation of shaft 136 will angularly displace the recesses for registry with the bottom of bin 120 for receiving a stick with the stick's longitudinal axis generally positioned parallel to the axis of rotation. A stick retaining guide is indicated at 144 and is positioned adjacent each wheel in the form of an annular rim for preventing inadvertent release of a stick. Thus, it can be seen that upon suitable rotation of wheels 132, 134, for instance in a clockwise direction as shown in FIG. 12, recesses 142 will periodically and successively be positioned for registry beneath bin 120 to receive a stick which falls therefrom. During movement of wheel 132 in a clockwise manner, a stick will be moved through a predetermined angular displacement before it will be permitted to fall, substantially vertically beneath an associated bin, from the end 144a of retaining guide 144. A predetermined side of the stick (such as its width) will be directed to engage the course therebeneath during the stick's fall. A positive stop is indicated at 145 and is mounted to bin 120 to provide a surface against which a stick may contact during rotation to ensure that the stick will fall at a preselected location.

Figure 9:
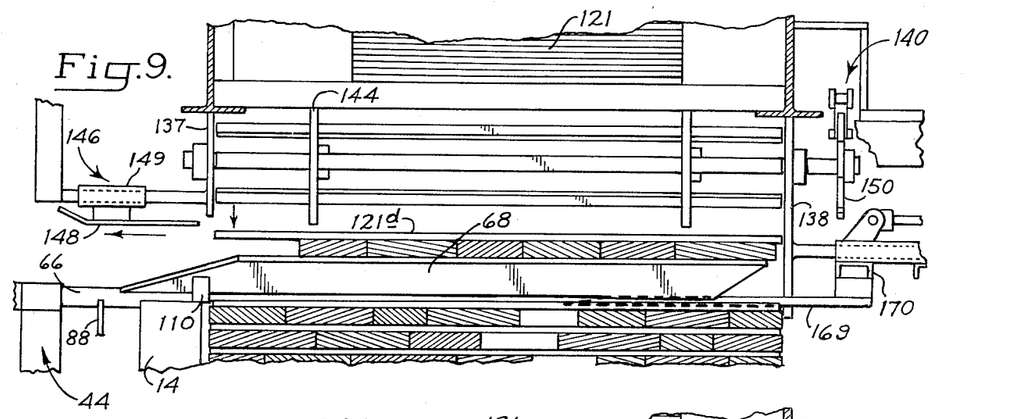
FIG. 9 is a view similar to FIG. 8 illustrating retraction of the detaining means to permit complete release of the stick onto the elevated course.

Thus, it can be seen that wheels, such as wheel 132 may be continuously loaded with a plurality of sticks such as indicated at 121a, 121b, 121c, etc. However, in order to ensure that a stick will drop with its width or longest side against the face of a course, it has been found advantageous to permit complete release of only one end of a stick from a recess on one of the wheels while at least momentarily deferring release of the other end of the stick from the opposed wheel. For instance, as can be seen in FIG. 8, the end of a stick to the right has been permitted to fall from wheel 134 onto an elevated course but the left hand end of the stick has been engaged by a detaining means generally indicated 146. Detaining means 146 is provided adjacent one wheel of each wheel set, for instance adjacent wheel 132 and is selectively operable for engaging one end of a released stick and momentarily maintaining it above the course prior to dropping the stick thereonto. Detaining means 146 includes a plate member 148 rectilinearly shiftable in a first direction for positioning beneath one end of a released stick to hold same. The plate member is rectilinearly shiftable in a second, reverse direction (see FIG. 9) so as to release the stick. During shifting of plate member 148 in the second, reverse direction, the end of the stick is gradually lowered as the plate member slides therealong prior to the stick being released. Plate member 148 is suitably supported on a slide element 149 which is rectilinearly shiftable in a first direction, for instance to the right, and also rectilinearly shiftable to the left. A source for selectively shifting plate member 148 in proper sequence, in a manner to be hereinafter described, is not shown in order to retain clarity of the drawing.

With respect to sequencing or indexing the wheel sets so that the recesses for receiving sticks are periodically and sequentially aligned with the bottom of a bin, an indexing means, generally indicated at 140, is provided. The discussion of the operation of indexing means 140 will proceed with its operation relative to bin 120 and wheels 132, 134. Of course, it is to be understood that a similar operation and sequence will occur beneath the other bins and their associated wheel sets. Considering FIGS. 7 and 8, and particularly FIG. 7, it can be seen that indexing means 140 includes an indexing ratchet-type wheel such as ratchet wheel 150 mounted on shaft 136 and concentrically aligned with wheels 132, 134. Ratchet wheel 150 includes ratchet teeth 152 provided adjacent the outer periphery thereof numerically corresponding to and aligned with the stick-receiving means such as recesses 142. As shown to the left of FIG. 7, indexing means 140 includes a power-driven means such as fluid-actuated cylinder 154 having a rod 156 which is operably connected to a drive arm provided with a pair of arms 158, 160 which extend generally transversely to the direction of transfer of the conveying means. The left hand ends of drive arms 158, 160 are suitably connected to an end of rod 156 and the drive arms are also supported for rectilinear shifting within guides 162, 164, etc. Mounted on the drive arms are pawl means, such as indicated at 166, 168 operable for periodically engaging teeth 152 on the ratchet wheels for rotatably driving same and thereby driving the wheels provided for receiving the sticks.

Figure 7:
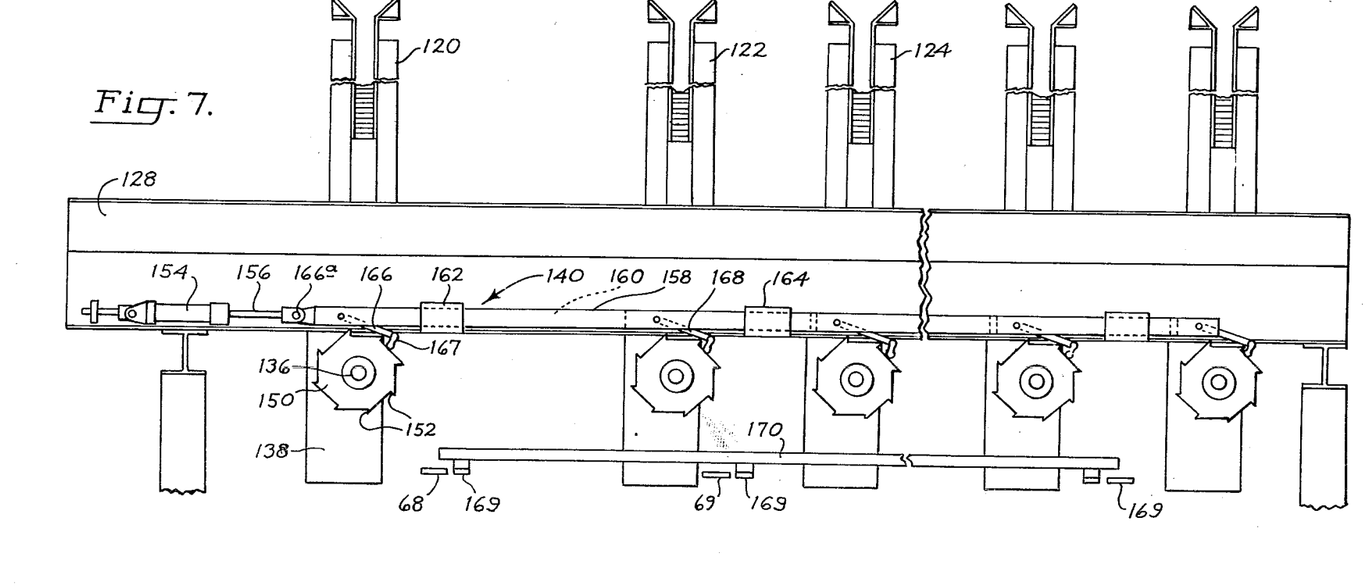
FIG. 7 is a view taken along lines 7—7 of FIG. 5 and illustrates mechanism including indexing means for periodically driving wheel sets of the placing means operable for depositing sticks on a course.

For instance, the retraction of rod 156 to the left will cause pawl means 166 with its catch element 167 to engage the tooth immediately to its left and rotate ratchet wheel 150 in a counterclockwise direction as shown in FIG. 7. Assuming that teeth 152 provided on ratchet wheel 150 are aligned with corresponding recesses 142 on wheels 132, 134, it can be seen that successive extension and retraction of rod 156, and its suitable positioning of arms 158, 160, will position pawl means 166 for periodically engaging successive teeth on the ratchet wheel for rotatably driving same. As can be seen from a consideration of FIG. 12, recesses 142 will be periodically and successively positioned beneath bin 120 for receiving a stick. Wheels 132, 134 will move a stick from directly beneat the bin through a predetermined angular displacement before the stick is permitted to be released. Similarly, the other ratchet wheels are provided with pawl means, such as indicated at 168 which serve to actuate associated wheel sets disposed beneath their respective stick-containing bins. Also, it is to be noted that the pawl means, such as pawl means 166 are pivotally connected to arms 158, 160 (as at 166a). The pawl means may therefore be manually pivoted out of engagement with an associated ratchet wheel if it is desired to isolate such ratchet wheel.

As mentioned previously with reference to FIG. 1, separating means 118 is provided for selective shifting beneath a course at the stacking station for holding at least some of the lumber in a course after the elevating means has been lowered. A more concise description of the separating means and its components will be set forth during the following description of the operation of the apparatus.

OPERATION OF THE APPARATUS

Proceeding now with a description of the operation of the apparatus of the present invention, attention is once again redirected to FIG. 1. As this description proceeds, it will be noted that certain power sources are not indicated but it is to be understood that such are provided and are sequentially controlled by means of suitably positioned limit switches or other control devices. Initially, carriage means 44 is positioned to the left, as shown in FIG. 1, with its lift elements, such as shown at 68, 69, etc. in FIG. 6, positioned beneath riding surface S of the conveying means. Additionally, cylinder 102 has retracted rod 104 so that the lumber engaging means, such as lumber engaging means 92, 94, etc. are also positioned beneath the riding surface. Lumber L is then transferred downstream by means of conveyor chains 24, 26, etc. until a leading piece of lumber contacts the stops, such as stop 110 provided on upright member 14. Successive pieces of lumber then tend to group or batch up behind the leading piece substantially as shown in FIG. 1. Detaining means 146 and separating means 118 are retracted as shown in FIG. 1.

After a predetermined number of pieces of lumber have been grouped or batched, cylinder 102 is actuated (as by a mill employee) to extend rod 104, as shown in FIG. 2, so that certain pieces of lumber are swung upwardly and held against limit means 106 so that the lumber is raised above riding surface S of conveying means 38. However, upstream lumber will continue to be transferred forwardly and held against lumber beneath limit means 106 to thereby be halted from further downstream travel. Thus, it can be seen that lumber engaging means 92, 94, etc. serve to divide upstream lumber from the course and thereby isolate the course therefrom. With carriage means still retracted or positioned to the left in its pre-spot position, actuating means 70 (see FIG. 6) is operated so as to retract rod 76 thereby laterally and obliquely translating arm means 78. The result is to rotate rotatable members 66, 67 and their associated lift elements 68, 69 etc. so that the course at first station 112 is elevated substantially horizontally as a unit above riding surface S. This is the position shown in FIG. 3.

Figure 4:
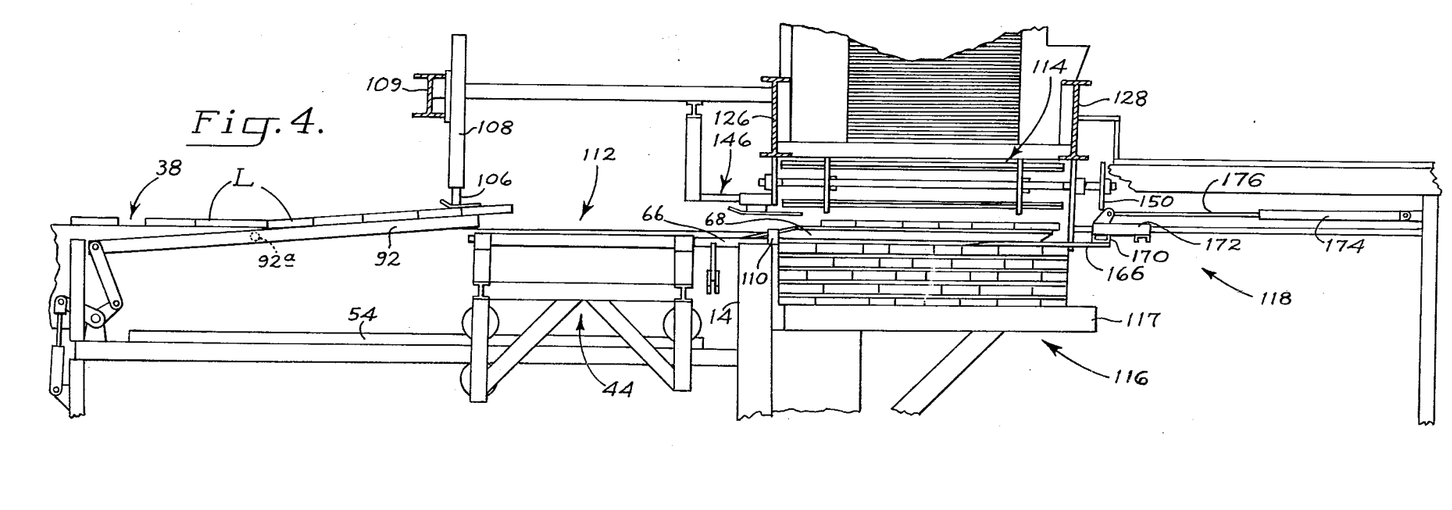
FIG. 4 is a view similar to FIGS. 1-3 and illustrates positioning of the course, by suitable forward shifting of the carriage means, so that the course is positioned beneath the stick placing means and above the stack being formed.

The next step is for the unit to be shifted to a position above stacking station 116 and below placing means 114. This is accomplished by suitably driving carriage means 44 to the right so that the elevated course is shifted over the stops, such as stops 110, to charge the course into position beneath the placing means. It is to be noted that during charging of the course, i.e. during movement of carriage means 44 to the right, detaining means 146 is also simultaneously moved to the right so that plate member 148 is positioned as shown in FIG. 4 (see also FIG. 8) for catching one end of a stick to be subsequently dropped. Also, simultaneous with shifting of carriage means 44 is a shifting to the left of separating means 118. Explaining further, separating means 118 includes a plurality of spaced-apart elongate bars 169 (see FIG. 7) which are mounted on a common horizontally extending mounting bar 170. Mounting bar 170 is slidably mounted by means of a guide 172 (see FIG. 4) and is operatively connected to a power-driven means 174 having an extendible-retractable rod 176. It is to be noted tht stacking station 116 has been suitably lowered so that extension of bars 169 toward the stacking station will result in positioning of the bars with their bottom surface slightly above the top surface of the previously stacked course. Or, stated differently, the top surface of the bars 169 is positioned slightly above the top of the last row of sticks laid but beneath the course about to be stacked.

Turning now to FIG. 8, it can be seen that a course has been shifted, in elevated position, above a developing stack. Detaining means 146, with plate member 148 has been positioned to the right, and bar 166 to the left. Upon suitable actuation of indexing means 140, a stick contained in opposed, aligned recesses on wheels 132, 134 will be rotated from a previous position to a drop or release position as shown in FIG. 12. Indexing means 140 is thereinafter successively and periodically operated to position recesses on the wheels to meet or register with an associated bin for receiving a stick and moving the stick, while suitably retaining same, until completion of the necessary predetermined angular displacement prior to permitting the stick to be released.

However, as referred to previously, detaining means 146 is positioned with plate member 148 so that the plate member will catch the left hand end of the stick as it is being released from wheel 132. Detaining means 146 is selectively operable for engaging one end of a released stick and momentarily maintaining it above the course prior to retraction of detaining means 146. During retraction, the end of the stick will contact support plate 136 so that it will drop inwardly of the support plate. The net effect of permitting the right hand end of a stick, as seen in FIG. 8, to contact the course while momentarily holding or catching the opposite end, and gradually lowering same during retraction of plate member 148, is to prevent the stick from excessive bouncing on the course. Of course, bouncing could result in the width of the stick becoming inadvertently vertically positioned. Controlling the release of the stick by permitting one end to drop prior to the other, effectively eliminates bouncing and the sticks are smoothly deposited or laid with their width properly positioned on the course.

Figure 10:
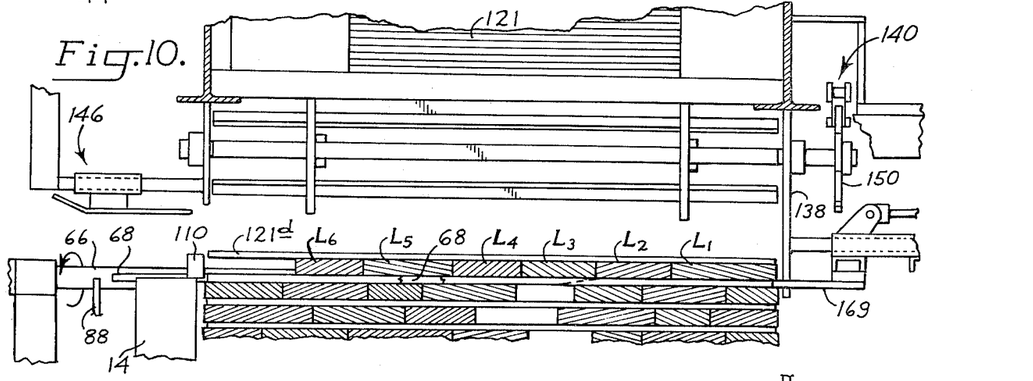
FIG. 10 is a view similar to FIG. 8 and 9 illustrating lowering of the course onto previously deposited sticks.
Figure 11:
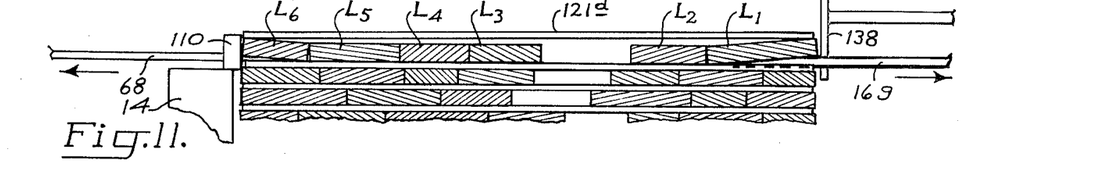
FIG. 11 is a view similar to FIGS. 8-10 and illustrates retraction of the carriage means and a separating means so that lumber in the course is separated.

Turning now to FIG. 10, it can be seen that the next step contemplates the lowering of the course, and this is accomplished by operating actuating means 70 so as to extend rod 76 and thereby return via lateral and oblique translation, arms means 80, 82 so that lift elements 68, 69, etc. are positioned beneath riding surface S. At this point, certain lumber pieces of the course, as shown at $L_1$, $L_2$, and $L_3$ contact and are supported on separator bars 169 while remainder pieces of lumber, such as indicated at $L_4$, $L_5$ etc. are supported on lift elements 68, 69 etc. It is to also be noted that with lift elements 68, 69 positioned as shown in FIG. 10 the left hand end of the placed stick will be directly across from a rear side of stop 110. Next, as shown in FIG. 11, carriage means 44 is retracted or returned to its pre-spot position which results in the retraction of lift elements 68, 69, etc. Simultaneously, separator bars such as bars 169 are retracted to the right as shown in FIG. 11. As can be seen, retraction of lift elements 68, 69 and separator bars 169 results in a separation of the lumber in opposite directions, i.e. some of the lumber is drawn to the left and some to the right. The result is the provision of an air space between at least some of the pieces of lumber. Additionally, separation of the lumber results in outside edges of outside pieces of lumber being substantially aligned on the first and second, opposed vertical planes which define external side boundaries of the stack. For instance, the inside surface of plate 138 and the rear side of stop 110 provides such opposed, vertical planes. Of course, it is important to provide an air space between at least some of the pieces of lumber, and particularly one which extends generally downwardly through the middle of a stack so that adequate circulation between lumber pieces occurs during the drying of the stack in a kiln.

After the separation step shown in FIG. 11, the developing stack is lowered to a position for receiving the next course and the entire process starts over and is repeated until a stack of a preselected height is formed. The stack is then transported from platform 117 to a suitable drying kiln.

From the above set forth description, it should be readily apparent that the present invention provides several significant advantages. For instance, the basic method of the invention which contemplates conveying lumber, isolating a course and then elevating and shifting the course beneath a placing means is an extremely simple procedure which may be readily automated. In addition, by providing a rotary feed means which places sticks in a manner to prevent bouncing also provides distinct advantages.

More particularly, the rotary feed means of the present invention is a precise and trouble-free mechanism which ensures accurate and controlled placement of sticks at preselected locations along the length of a course. By periodically positioning or registering recesses provided in opposed, spaced-apart wheels, the sticks may be displaced through a predetermined angular displacement and permitted to be released onto preselected locations on a course. Further, the concept of releasing one end of a stick while momentarily detaining release of other end above a course provides significant advantages. The detaining means of the present invention, as shown in FIG. 8, is a simple mechanism which may be readily extended for catching one end of a stick, momentarily holding it while the other end is permitted to drop. The detaining means may then be retracted, the held end of the stick is released, and the stick is permitted to fall, overall, in a controlled precision lay-down manner. Bouncing and skewing of sticks are virtually eliminated which ensures that lumber in a course will be laid at a substantially horizontal orientation on sticks.

Another advantage of the present invention resides in the use of carriage means 44 which includes means for elevating, by rotation, a course which will become the next tier on a developing stack. More specifically, by rotating shafts 66, 67, etc. and swinging their associated lift elements 68, 69, respectively upwardly, a course may be horizontally elevated as a unit. There is an advantage to horizontally elevating a course in that the course will be maintained at a relatively constant elevation during forward shifting of carriage means and during lowering of the course. Lowering of the course, as described above, is advantageous from the standpoint that the lift elements, such as lift elements 68, 69, etc. are positioned in their lowered position at approximately the same height as separator bars 169. Additionally, the upper surface of lift elements 68, 69 and separator bars 169 and the position shown in FIG. 7, is only slightly higher than the height of the last previously laid series of sticks. This can be appreciated from a consideration of FIGS. 10 and 11 and results in minimal dropping of the course onto to previously laid sticks during retraction of carriage means 44 and separatin means 118. Of course, this results in a controlled, precise positioning of each course on the developing stack.

While the present invention has been described with reference to the foregoing preferred embodiment, it will be readily apparent to those skilled in the art that other changes in form and detail may be made without departing from the spirit and scope of the invention as defined in the appended claims.

It is hereby claimed and desired to secure by Letters Patent:

1. Apparatus for forming a lumber stack by laying successive lumber courses and providing sticks between adjacent courses comprising:
   conveying means operable for transferring a course to be stacked to a first station;
   positioning means disposed adjacent said conveying means operable for selectively elevating the course as a unit occupying a substantially horizontal plane and shifting it into position above a stacking station, said positioning means including elongate members rotatably mounted on a carriage means, said elongate members extending forwardly of said carriage means and being operable, during rotation thereof, for selective positioning above and below the riding surface of said conveying means, said carriage means being reciprocally shiftable relative to the direction of transfer of said conveying means for selectively locating said elongate members adjacent said first station and said stacking station;
   actuating means connected to said elongate members operable for imparting rotation about the longitudinal axis of said elongate members for obtaining raising and lowering of a course relative to said conveying means; and
   placing means disposed above said stacking station operable for selectively depositing sticks generally transversely to the lengthwise dimension of the course at laterally spaced locations thereon.

2. The apparatus of claim 1 wherein said elongate members each include a shaft having a generally planar lift element radially mounted thereon extending generally parallel to the longitudinal axis of said shaft, said lift element contacting the course during raising and lowering of same.

3. The apparatus of claim 1 further including arm means connected to each of said elongate members and mounted therebeneath, said actuating means being mounted on said carriage means and being operatively connected to said arm means for selectively shifting same, thereby imparting rotation to said elongate members.

4. The apparatus of claim 3 wherein said arm means is suspended from said elongate members.

5. The apparatus of claim 3 wherein said actuating means is operable for selectively imparting reciprocal lateral and oblique translation of said arm means for angularly displacing each of said lift elements above and below the riding surface.

6. The apparatus of claim 1 wherein said placing means includes driven rotary feed means operable for periodically receiving sticks and directing them through a predetermined angular displacement and periodically releasing them onto successive courses.

7. The apparatus of claim 6 wherein said rotary feed means includes a plurality of rotatable wheel sets disposed above said stacking station adjacent said laterally spaced locations, each wheel set being disposed beneath a stick-containing bin and each wheel set including a pair of opposed, spaced-apart concentrically mounted wheels operable for movement about an axis of rotation, each wheel being provided with a plurality of stick-receiving means aligned with corresponding stick-receiving means on its associated opposed wheel, said stick-receiving means being movable through the predetermined angular displacement for receiving a stick from the bin with the stick's longitudinal axis being generally positioned parallel to the axis of rotation.

8. The apparatus of claim 7 wherein said stick-receiving means are defined by a plurality of recesses formed adjacent the outer periphery of each wheel, said recesses being successively and periodically positionable for registry with an associated bin for receiving a stick, the stick being suitably retained in opposed recesses until completion of the predetermined angular displacement whereupon the stick is released.

9. The apparatus of claim 8 wherein a stick-retaining guide is positioned adjacent each wheel in the form of an annular rim which prevents inadvertent release of a stick prior to substantial completion of the predetermined angular displacement.

10. The apparatus of claim 8 wherein detaining means are provided adjacent one wheel of each wheel set selectively operable for engaging one end of a released stick and momentarily maintaining it above the course prior to complete release and deposit of the stick onto a course.

11. The apparatus of claim 10 wherein said detaining means includes a plate member rectilinearly shiftable in a first direction for positioning beneath one end of a released stick so as to hold same, said plate member being rectilinearly shiftable in a second, reverse direction so as to release the stick.

12. The apparatus of claim 11 wherein said plate member is slidably mounted on a support preceeding the stacking station.

13. The apparatus of claim 7 further including indexing means operable for selectively positioning individual stick receiving means on said wheels in registry with the bottom of an associated bin.

14. The apparatus of claim 13 wherein said indexing means includes a driven rachet-type wheel concentrically aligned and connected to each wheel pair of each wheel set, said rachet wheel including rachet teeth numerically corresponding to said stick-receiving means, said indexing means further including pawl means operable for periodically engaging successive teeth on said rachet wheel for rotatably driving same and thereby driving said rotary wheels.

15. The apparatus of claim 14 wherein said indexing means includes drive means operably connected to each pawl means, said drive means including power-driven means operably connected to a drive arm which in turn is connected to each pawl means, said drive arm extending generally transversely to the direction of transfer of said conveying means.

16. The apparatus of claim 15 wherein said drive arm is mounted for reciprocal rectilinear shifting.

17. Apparatus for forming a lumber stack by laying successive lumber courses and providing sticks between adjacent courses comprising:

conveying means operable for transferring a course to be stacked to a first station;

dividing means disposed adjacent said conveying means operable for selectively isolating a course from upstream lumber at said first station;

positioning means disposed adjacent said conveying means operable for selectively elevating the isolated course as a unit occupying a substantially horizontal plane and shifting it into position above a stacking station prior to lowering the course onto the stacking station, said positioning means including carriage means provided with elevating means, said carriage means being shiftable from a pre-spot position adjacent said first station with an elevated course to a position whereby the course is located above said stacking station, said elevating means being operable for lowering the course at said stacking station after which said carriage means is returnable to the pre-spot position;

placing means disposed adjacent said stacking station operable for selectively depositing sticks generally transversely to the lengthwise dimension of the course at laterally-spaced locations; and separating means disposed adjacent said stacking station operable for selective extension to a position beneath the course elevated at said stacking station for holding at least some of the pieces of the course after said elevating means has been lowered, said separating means also being operable for selective retraction in a direction opposite to the return of said carriage means for separating at least some of the pieces of lumber from the remainder of the course during retraction of said separating means.

18. The apparatus of claim 17 wherein said dividing means includes lumber-engaging means disposed upstream from said first station operable for selective upward positioning so that lumber is engaged thereon and retarded from further transfer to said first station, said lumber-engaging means being returnable downwardly for lumber disengagement to permit transfer to said first station.

19. The apparatus of claim 18 wherein said lumber-engaging means includes a plurality of spaced-apart pivotal members operable for swinging about a generally horizontal axis.

20. The apparatus of claim 19 further including limit means disposed above said pivotal members positioned to engage and retain at least some lumber being moved upwardly by said pivotal members.

21. The apparatus of claim 17 wherein said elevating means includes laterally spaced-apart elongate members rotatably mounted on and extending forwardly of said carriage means, raising and lowering of a course being obtained by rotation of said elongate members.

22. The apparatus of claim 17 wherein said separating means includes a plurality of elongate bars corresponding numerically to said elongate members of said carriage means.

23. Apparatus for forming a lumber stack by laying successive lumber courses and providing sticks between adjacent courses comprising:

conveying means operable for transferring a course to be stacked to a first station;

positioning means disposed adjacent said conveying means operable for selectively elevating the course as a unit occupying a substantially horizontal plane and shifting it into position above a stacking station;

placing means disposed above said stacking station operable for selectively depositing sticks generally transversely to the lengthwise dimension of the course at laterally-spaced locations thereon, said placing means including driven rotary feed means operable for periodically receiving sticks and directing them through a predetermined angular displacement and periodically releasing them onto successive courses, said rotary feed means including a plurality of rotatable wheel sets disposed above said stacking station adjacent said laterally-spaced locations, each wheel set being disposed beneath a stick receiving bin and including a pair of opposed, spaced-apart concentrically mounted wheels operable for movement about an axis of rotation, each wheel being provided with a plurality of recesses formed adjacent the outer periphery thereof aligned with corresponding recesses on an associated opposed wheel, said recesses being successively and periodically positionable, upon rotation of said wheels, for registry beneath an associated bin for receiving a stick with the stick's longitudinal axis being generally positioned parallel to the axis of rotation, the stick being suitably retained in opposed recesses until completion of the predetermined angular displacement whereupon the stick is released onto the course with a predetermined side of the stick facing the course substantially vertically beneath an associated bin; and detaining means positioned adjacent one wheel of each wheel set selectively operable for rectilinear shifting in a first direction for positioning beneath one end of a released stick so as to momentarily hold same and maintain it above the course, said detaining means also being selectively operable for rectilinear shifting in a second, reverse direction to release the stick so that it may be deposited onto a course.

24. The apparatus of claim 23 wherein said detaining means includes a plate member slidably mounted on a support preceding the stacking station.

25. The apparatus of claim 24 further including indexing means operable for selectively positioning individual stick receiving means on said wheels in registry with the bottom of an associated bin.

26. The apparatus of claim 25 wherein said indexing means includes a driven ratchet-type wheel concentrically aligned and connected to each wheel set, said ratchet-type wheel including ratchet teeth numerically corresponding to said stick-receiving means, said indexing means further including pawl means operable for periodically engaging successive teeth on said ratchet wheel for rotatably driving same and thereby driving said rotary wheels.

27. The apparatus of claim 25 wherein said indexing means includes drive means operably connected to each pawl means, said drive means including power-driven means operably connected to a drive arm which, in turn, is connected to each pawl means, said drive arm extending generally transversely to the direction of transfer of said conveying means.

28. The apparatus of claim 27 wherein said drive arm is mounted for reciprocal rectilinear shifting.

* * * * *